United States Patent
Kaluzhny

(10) Patent No.: US 8,266,194 B2
(45) Date of Patent: Sep. 11, 2012

(54) LINEAR FEEDBACK SHIFT REGISTERS WITH XOR LOGIC GATES INCLUDING A BIT GENERATOR TO CONTROL MOVEMENT ALONG STAGES

(75) Inventor: Uri Kaluzhny, Jerusalem (IL)

(73) Assignee: NDS Limited, Staines, Middlesex (GB)

( * ) Notice: Subject to any disclaimer, the term of this patent is extended or adjusted under 35 U.S.C. 154(b) by 681 days.

(21) Appl. No.: 12/448,663

(22) PCT Filed: Jun. 26, 2008

(86) PCT No.: PCT/IB2008/052574
§ 371 (c)(1),
(2), (4) Date: Jun. 29, 2009

(87) PCT Pub. No.: WO2009/074889
PCT Pub. Date: Jun. 18, 2009

(65) Prior Publication Data
US 2010/0036899 A1 Feb. 11, 2010

(30) Foreign Application Priority Data
Dec. 12, 2007 (IL) .......................................... 188089

(51) Int. Cl.
*G06F 7/58* (2006.01)
*G11C 19/00* (2006.01)
(52) U.S. Cl. ........... 708/252; 708/251; 708/250; 377/72
(58) Field of Classification Search ........................ None
See application file for complete search history.

(56) References Cited

U.S. PATENT DOCUMENTS

| | | | | |
|---|---|---|---|---|
| 5,105,376 | A * | 4/1992 | Pedron | 708/252 |
| 6,065,029 | A * | 5/2000 | Weiss | 708/251 |
| 6,167,553 | A | 12/2000 | Dent | |
| 6,240,432 | B1 * | 5/2001 | Chuang et al. | 708/252 |
| 6,785,389 | B1 | 8/2004 | Sella et al. | |
| 7,206,797 | B2 * | 4/2007 | Gressel et al. | 708/250 |
| 7,571,200 | B2 * | 8/2009 | Shackleford et al. | 708/250 |
| 7,827,223 | B2 * | 11/2010 | Gressel et al. | 708/250 |
| 8,107,622 | B2 * | 1/2012 | Gressel et al. | 380/28 |
| 2003/0085286 | A1 | 5/2003 | Kelley et al. | |

(Continued)

OTHER PUBLICATIONS

Olivier Benoit et al., "Efficient Use of Random Delays" (Royal Holloway, University of London).
Alfred J. Menezes et al., *Handbook of Applied Cryptography*, Chap 6: Stream Ciphers (CRC Press 1996).

*Primary Examiner* — Tammara Peyton
(74) *Attorney, Agent, or Firm* — Husch Blackwell LLP

(57) ABSTRACT

A system comprising a feedback shift-register having L serially connected stages, and a non-linear feedback sub-system to receive input from stage n and 2n+1, and including a first AND gate having a first and second input operationally connected to the output of stage n and 2n+1, respectively, the sub-system having an output based on a value of an output of the first AND gate, a bit generator operative to generate bits, and an XOR gate having a first and second input, an output of the bit generator being operationally connected to the first input of the XOR gate, the output of the sub-system being operationally connected to the second input of the XOR gate, the output of the XOR gate being operationally connected to the input of the first stage of the shift-register. Related apparatus and methods are also described.

7 Claims, 11 Drawing Sheets

U.S. PATENT DOCUMENTS

2004/0076293 A1 4/2004 Smeets et al.
2004/0205095 A1 10/2004 Gressel et al.
2005/0097153 A1 5/2005 Dirscherl et al.
2006/0161610 A1 7/2006 Goettfert et al.

* cited by examiner

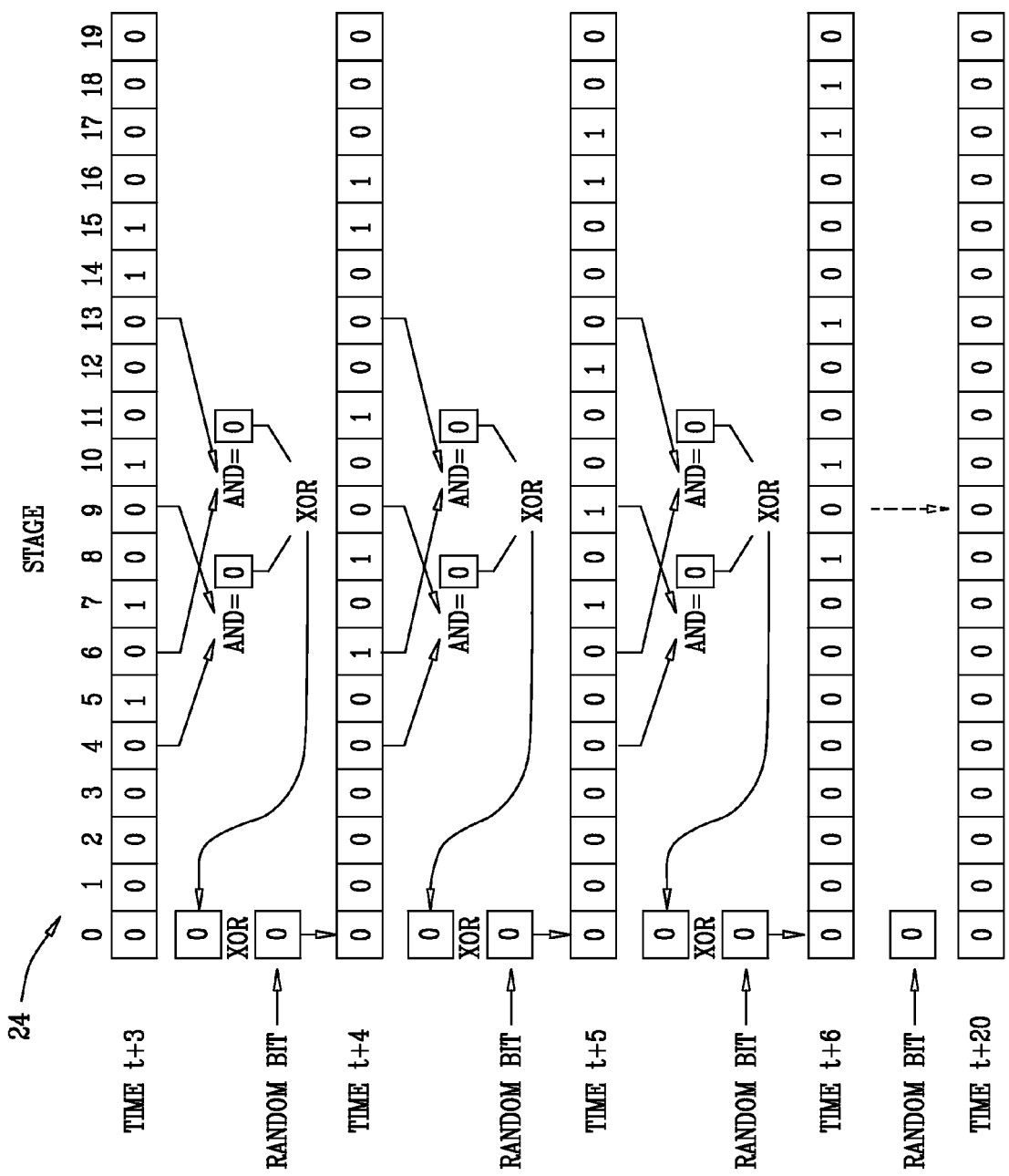

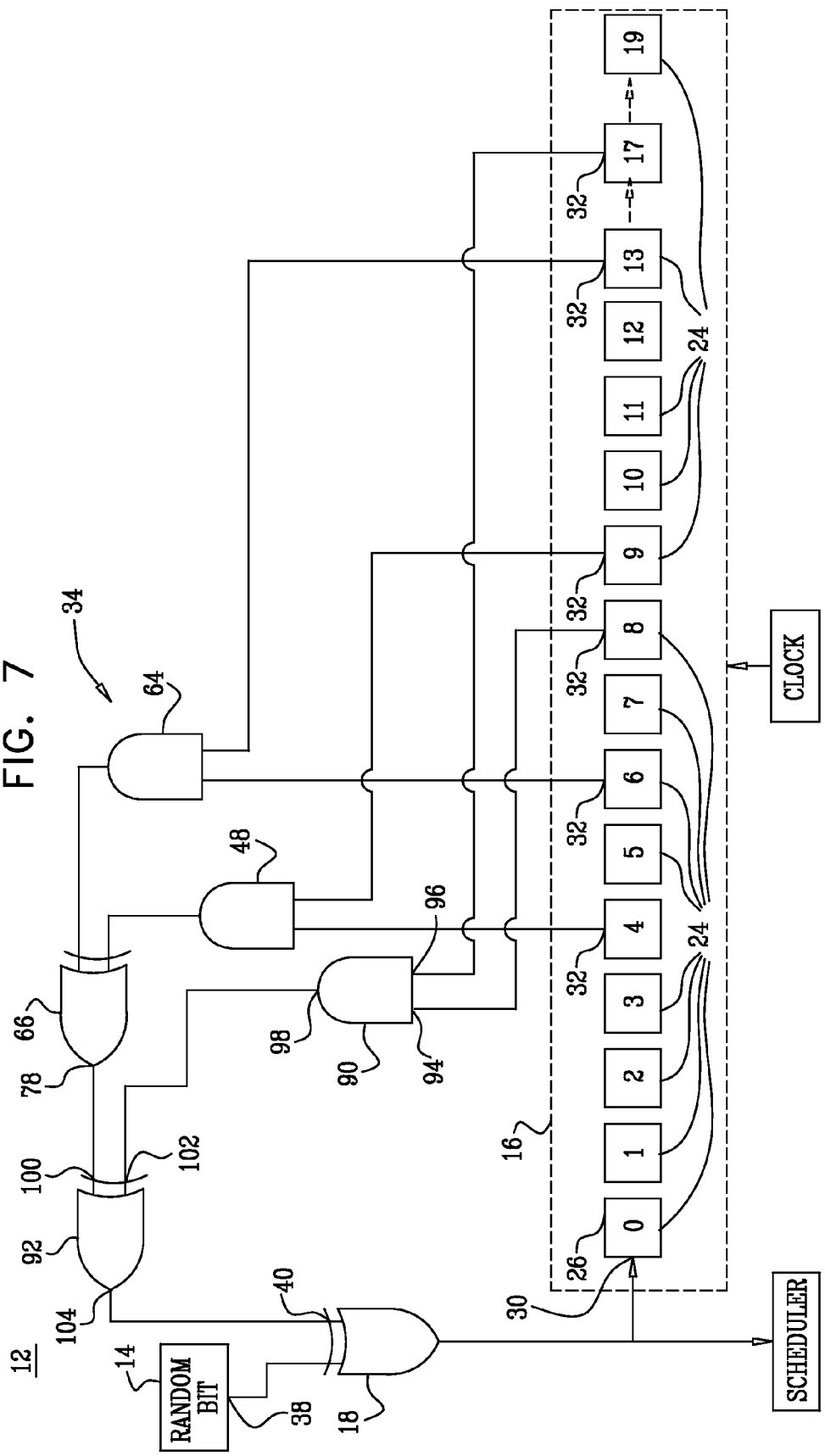

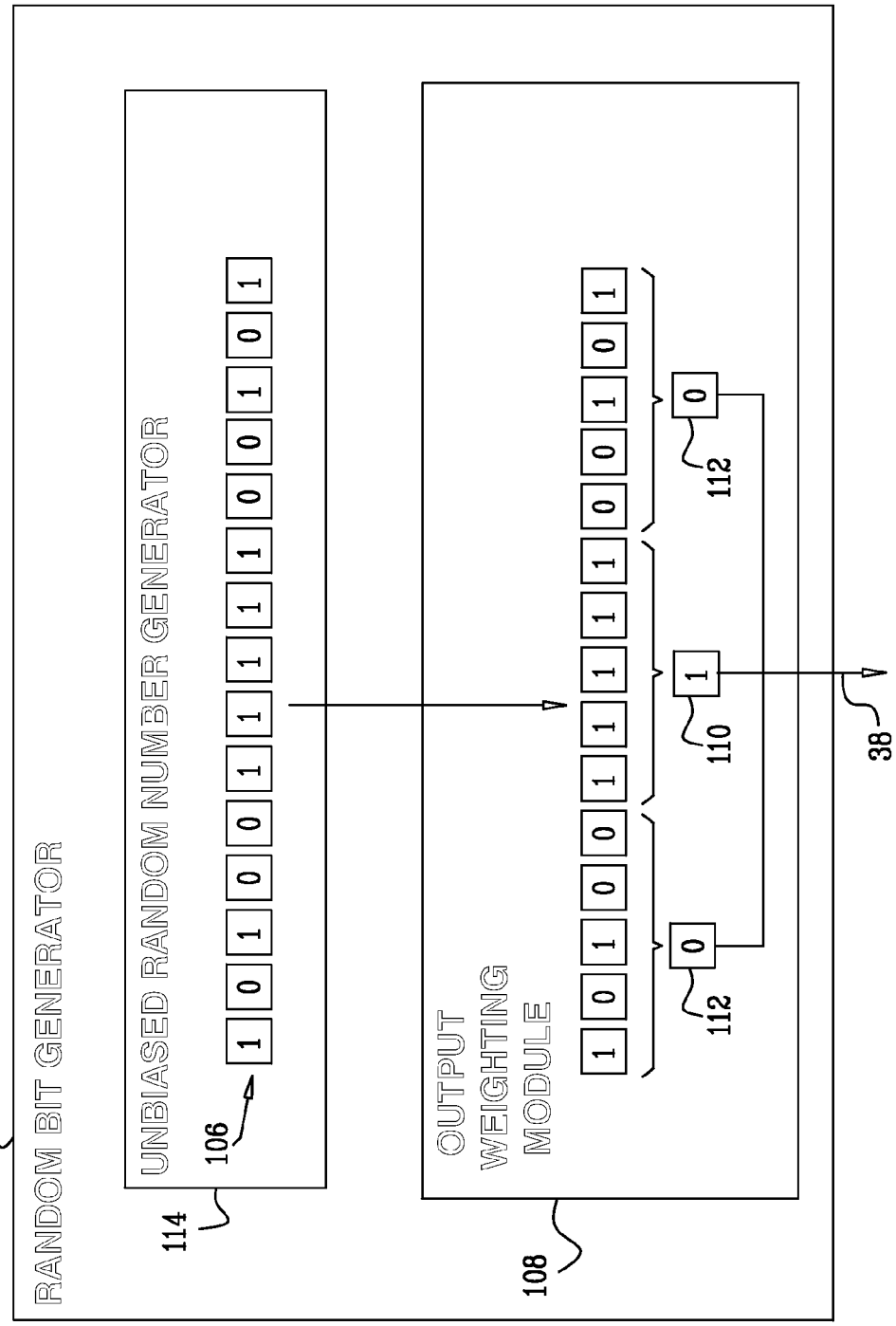

LINEAR FEEDBACK SHIFT REGISTERS WITH XOR LOGIC GATES INCLUDING A BIT GENERATOR TO CONTROL MOVEMENT ALONG STAGES

The present application is a 35 USC §371 application of PCT/IB2008/052574, filed on 26 Jun. 2008 and entitled "Bit Generator", which was published on 18 Jun. 2009 in the English language with International Publication Number WO 2009/074889 and which relies for priority on Israel Patent Application No. 188089, filed on 12 Dec. 2007.

FIELD OF THE INVENTION

The present invention relates to random or pseudo-random bit generators, and in particular to, non-linear feedback shift registers.

BACKGROUND OF THE INVENTION

By way of introduction, the use of random delays, also known as random wait-states, is often proposed as a generic counter-measure against side-channel analysis and fault attacks by stalling a CPU during execution of embedded software. The efficiency of a random delay triggering scheme improves as the variance of the random wait-states increases. However, systems typically incorporate random wait-states that are uniformly distributed.

The following references are also believed to represent the state of the art:

U.S. Pat. No. 6,167,553 to Dent;
U.S. Pat. No. 6,785,389 to Sella, et al.;
US Published Patent Application 2003/0085286 of Kelley, et al.;
US Published Patent Application 2004/0076293 of Smeets, et al.;
US Published Patent Application 2004/0205095 of Gressel, et al.;
US Published Patent Application 2006/0161610 of Goettfert, et al.;
Article entitled "Efficient Use of Random Delays" by Olivier Benoit and Michael Tunstall of Royal Holloway, University of London; and
Chapter 6 of Handbook of Applied Cryptography (CRC Press Series on Discrete Mathematics and Its Applications) by Alfred J. Menezes, Paul C. van Oorschot, and Scott A. Vanstone.

The disclosures of all references mentioned above and throughout the present specification, as well as the disclosures of all references mentioned in those references, are hereby incorporated herein by reference.

SUMMARY OF THE INVENTION

The present invention seeks to provide an improved feedback shift-register.

There is thus provided in accordance with a preferred embodiment of the present invention, a system, including a feedback shift-register having L serially connected stages including a first stage and a final stage, the stages being denoted 0 to L−1 from the first stage to the final stage respectively, the stages being operative to store a plurality of bits such that each of the stages is operative to store one of the bits, and a non-linear feedback sub-system, at least some of the stages having an output operationally connected to the non-linear feedback sub-system, the non-linear feedback sub-system being operative to receive input from a stage n and a stage 2n+1 of the stages, the non-linear feedback sub-system including a first AND logic gate, the first AND logic gate having a first input operationally connected to the output of the stage n, a second input operationally connected to the output of the stage 2n+1, and an output, the non-linear feedback sub-system having an output based, at least in part, on a value of the output of the first AND logic gate, a clock operationally connected to the feedback shift-register, the clock being operative to control the movement of the bits along the stages, a bit generator having an output, the bit generator being operative to generate a plurality of random/pseudo-random bits for outputting via the output of the bit generator, and a main XOR logic gate having a first and second input and an output, the output of the bit generator being operationally connected to the first input of the main XOR logic gate, the output of the non-linear feedback sub-system being operationally connected to the second input of the main XOR logic gate, the output of the main XOR logic gate being operationally connected to the input of the first stage of the non-linear feedback register.

Further in accordance with a preferred embodiment of the present invention the non-linear feedback sub-system is operative to receive input from a stage m and a stage 2m+1 of the stages, the non-linear feedback sub-system includes a second AND logic gate and a first XOR logic gate, the second AND logic gate having a first input operationally connected to the output of the stage m, a second input operationally connected to the output of the stage 2m+1, and an output, the first XOR logic gate of the feedback sub-sub-system has a first input operationally connected to the output of the first AND logic gate, and a second input operationally connected to the output of the second AND logic gate, and the output of the non-linear feedback sub-system is based, at least in part, on a value of the output of the first XOR logic gate of the non-linear feedback sub-system.

Still further in accordance with a preferred embodiment of the present invention the non-linear feedback sub-system is operative to receive input from a stage k and a stage 2k+1 of the stages, the non-linear feedback sub-system includes a third AND logic gate and a second XOR logic gate, the third AND logic gate having a first input operationally connected to the output of the stage k, a second input operationally connected to the output of the stage 2k+1, and an output, the second XOR logic gate of the feedback sub-sub-system has a first input operationally connected to the output of the first XOR logic gate, and a second input operationally connected to the output of the third AND logic gate, and the output of the non-linear feedback sub-system is based, at least in part, on a value of the output of the second XOR logic gate of the non-linear feedback sub-system.

Additionally in accordance with a preferred embodiment of the present invention the bit generator is operative such that the output of the bit generator is biased a state of the stages of the feedback shift-register.

Moreover in accordance with a preferred embodiment of the present invention, the system includes a scheduler having an input operationally connected to the main XOR logic gate or the feedback shift-register, the scheduler being operative to schedule a plurality of wait-states data received by the input of the scheduler.

There is also provided in accordance with still another preferred embodiment of the present invention a wait-state system to schedule a plurality of wait-states, including a feedback shift-register having a plurality of serially connected stages including a first stage, the stages being operative to store a plurality of bits such that each of the stages is operative to store one of the bits, and a non-linear feedback sub-system, at least one of the stages having an output operationally connected to the non-linear feedback sub-system, the non-linear feedback sub-system being operative to receive input from at least one of the stages, the non-linear feedback sub-system being operative such that an output of the non-linear feedback sub-system is a non-linear function of the input of the non-linear feedback sub-system, the output of the non-linear feedback sub-system being operationally connected to the first stage, a clock operationally connected to the feedback shift-register, the clock being operative to control the movement of the bits along the stages, and a scheduler having an input operationally connected to the feedback shift-register, the scheduler being operative to schedule a plurality of wait-states data received by the input of the scheduler.

There is also provided in accordance with still another preferred embodiment of the present invention a method, including providing a feedback shift-register having L serially connected stages including a first stage and a final stage, the stages being denoted 0 to L−1 from the first stage to the final stage respectively, the stages being operative to store a plurality of bits such that each of the stages is operative to store one of the bits, and performing the following a plurality of times performing an AND logic gate operation with the output of a stage n and a stage 2n+1 of the stages as input, generating a random/pseudo-random bit, performing an XOR logic gate operation with the bit and a result of the AND logic gate operation as input, shifting the bits along the stages, and inserting a result of the XOR logic gate operation into the first stage.

There is also provided in accordance with still another preferred embodiment of the present invention a method including providing a feedback shift-register having a plurality of serially connected stages including a first stage and a final stage, the stages being operative to store a plurality of bits such that each of the stages is operative to store one of the bits, performing the following a plurality of times performing a non-linear function on the output of at least one of the stages, shifting the bits along the stages, inserting a new value in to the first stage, the new value being based on the result of the non-linear function, and scheduling a wait-state based on an output of the feedback shift-register.

BRIEF DESCRIPTION OF THE DRAWINGS

The present invention will be understood and appreciated more fully from the following detailed description, taken in conjunction with the drawings in which:

FIGS. 6a and 6b are partly pictorial, partly block diagram views illustrating operation of the random wait-state scheduler of FIG. 5;

FIG. 7 is a third preferred embodiment of the random wait-state scheduler of FIG. 2;

FIG. 9 is a partly pictorial, partly block diagram view of a random bit generator for use with the secure device of FIG. 1.

DETAILED DESCRIPTION OF A PREFERRED EMBODIMENT

Figure 1:
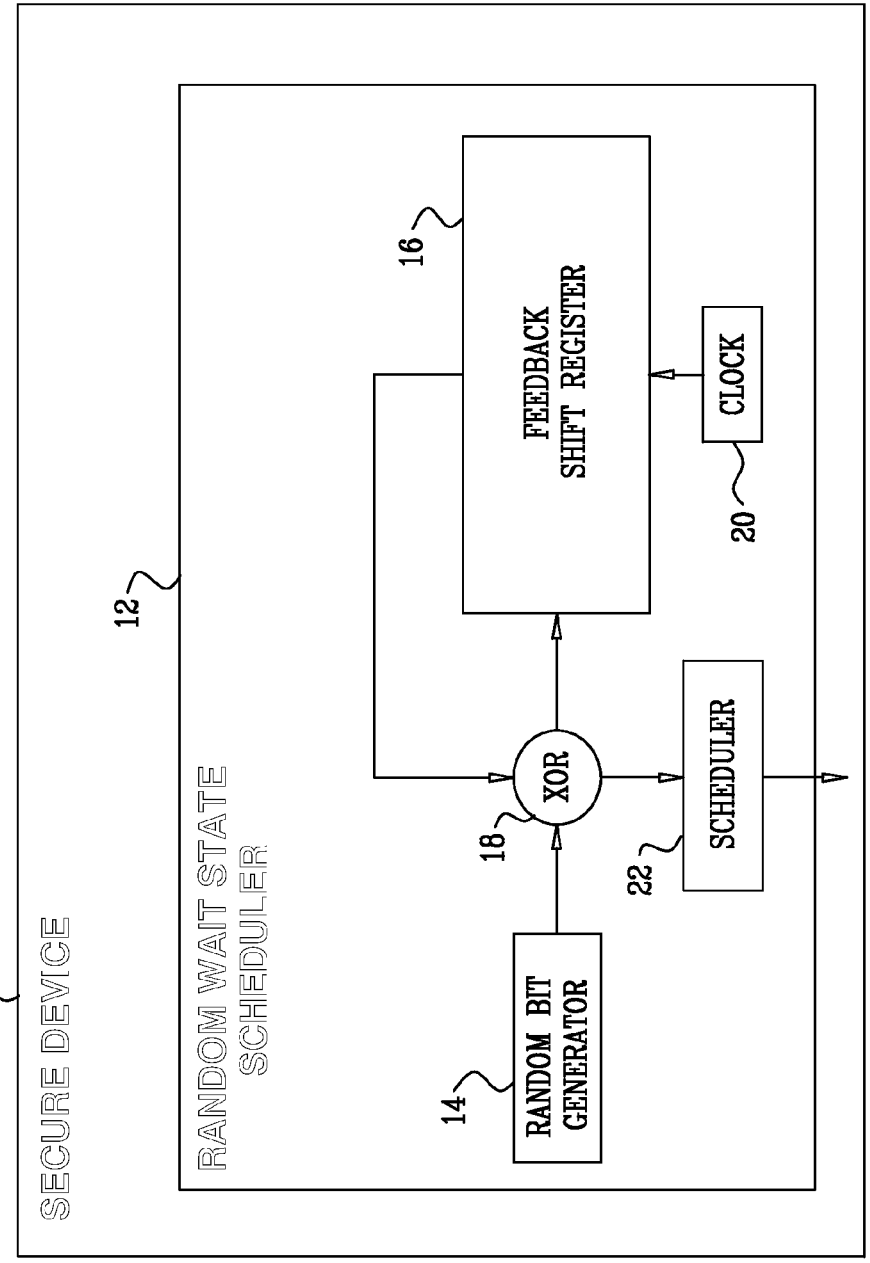
FIG. 1 is a block diagram view of a secure device constructed and operative in accordance with a preferred embodiment of the present invention.

Reference is now made to FIG. 1, which is a block diagram view of a secure device 10 constructed and operative in accordance with a preferred embodiment of the present invention. The secure device 10 preferably includes a random wait-state scheduler 12 to schedule a plurality of wait-states.

The random wait-state scheduler 12 preferably includes a random bit generator 14, a feedback shift-register 16, a main exclusive-OR (XOR) logic gate 18, a clock 20 and a scheduler 22.

Figure 2:
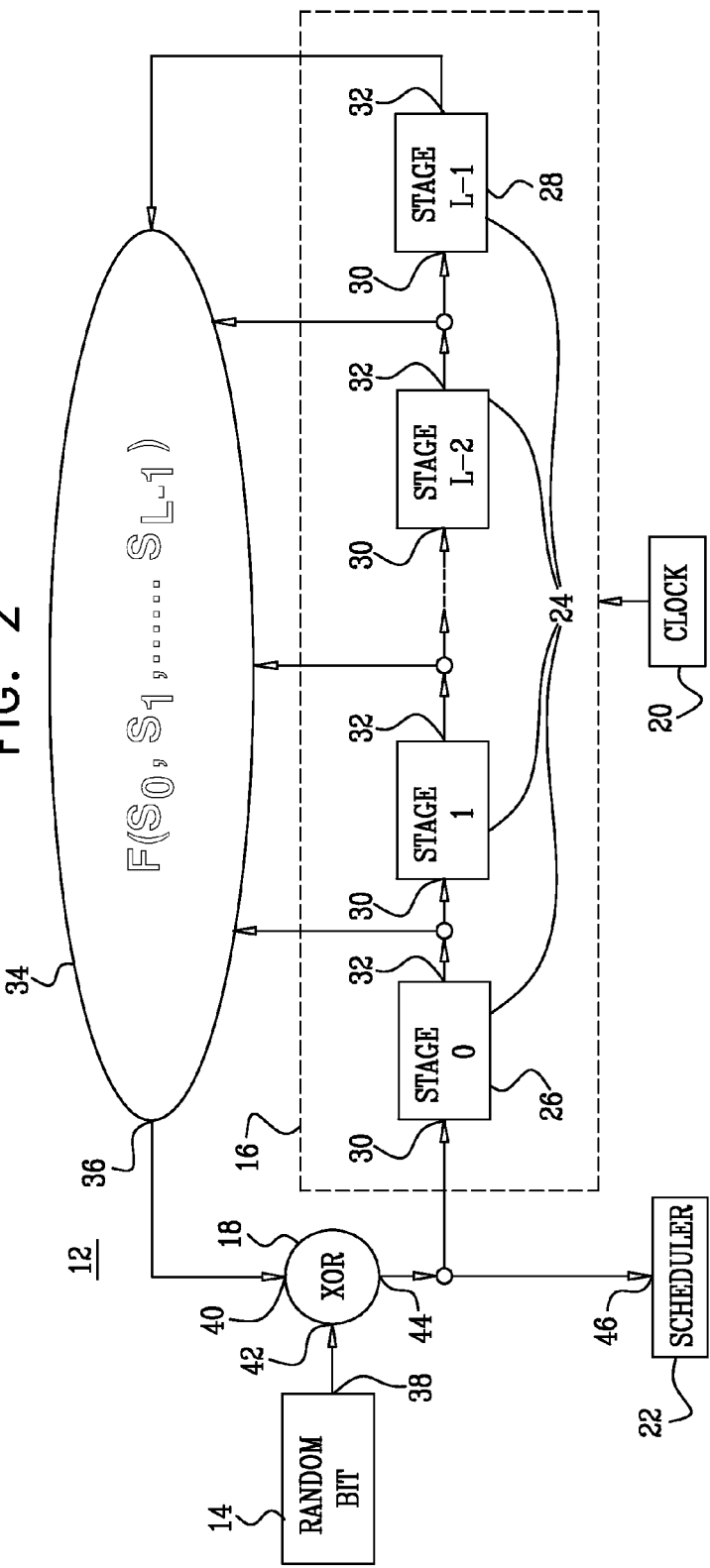
FIG. 2 is a block diagram view of a random wait-state scheduler for use with the secure device of FIG. 1.

Reference is now made to FIG. 2, which is a block diagram view of the random wait-state scheduler 12 for use with the secure device 10 of FIG. 1.

The feedback shift-register 16 preferably includes L serially connected stages 24, typically implemented as flip-flops, including a first stage 26 and a final stage 28. The stages 24 are typically denoted 0 to L−1 from the first stage 26 to the final stage 28, respectively. In other words the stages are numbered 0, 1, . . . L−2, L−1. The stages 24 are preferably operative to store a plurality of bits such that each of the stages 24 is operative to store one of the bits. Each of the stages 24 typically includes an input 30 and an output 32 for serially connecting the stages 24. The content of the stages 24 at a time t is called the state at the time t.

The feedback shift-register 16 preferably includes a non-linear feedback sub-system 34 which is operationally connected to the output 32 of the stages 24, as appropriate. Generally, the non-linear feedback sub-system 34 only needs to be operationally connected to the output 32 of the stages 24 needed for the non-linear feedback sub-system 34, as will be explained in more detail with reference to FIGS. 3, 5 and 7. Therefore, the non-linear feedback sub-system 34 is typically operative to receive input from at least some of the stages 24. The non-linear feedback sub-system 34 preferably has an output 36 which is operationally connected to the first stage 26 via the main exclusive-OR logic gate 18 as will be described in more detail below.

The non-linear feedback sub-system 34 is preferably operative to perform a Boolean feedback function F such that the output of the non-linear feedback sub-system 34 is a non-linear function of the input of the non-linear feedback sub-system 34. The feedback function F is described in more detail below.

The clock 20 is preferably operationally connected to the non-linear feedback shift-register 16. The clock 20 is generally operative to control the movement of the bits along the stages 24 and through the non-linear feedback sub-system 34.

The random bit generator 14 typically has an output 38. The random bit generator 14 is preferably operative to generate a plurality of random/pseudo-random bits for outputting via the output 38 of the random bit generator 14. The random bit generator 14 is described in more detail with reference to FIG. 9.

The main exclusive-OR logic gate 18 has preferably an input 40, an input 42 and an output 44.

The output 38 of the random bit generator 14 is preferably operationally connected to the input 42 of the main exclusive-OR logic gate 18. The output 36 of the non-linear feedback sub-system 34 is preferably operationally connected to the input 40 of the main exclusive-OR logic gate 18. The output 44 of the main exclusive-OR logic gate 18 is preferably operationally connected to an input 46 of the scheduler 22 and to the input 30 of the first stage 26 of the feedback shift-register 16.

The scheduler 22 is preferably operative to schedule a plurality of wait-states according to data received by the input 46 of the scheduler 22. For example, when the data at the input 46 is a "1" then a wait-state is scheduled for a certain time period, typically one clock cycle.

In accordance with an alternative preferred embodiment of the present invention, the input 46 of the scheduler 22 may be operationally connected to any of the outputs 32 of the stages 24 or to the output 36 of the non-linear feedback sub-system 34.

Operation of the random wait-state scheduler 12 is briefly described below.

During each unit of time (clock cycle) the following operations are preferably performed. The non-linear feedback sub-system 34 performs a non-linear function F on the output of one or more of the stages 24, described in more detail with reference to FIGS. 3-9. The random bit generator 14 generates a random/pseudo-random bit. The main exclusive-OR logic gate 18 performs an exclusive-OR (XOR) logic gate operation with the bit and a result of the function F of the non-linear feedback sub-system 34. The clock 20 causes the bits to shift along the stages 24, so that for each stage 24 from 0 to L−2, the content $S_i$ of stage is moved to stage i+1. A new value is inserted into the first stage 26 by inserting a result of the XOR logic gate operation (which is based on a result of the non-linear function F) into the first stage 26. The scheduler 22 schedules a wait-state based on the output of the main exclusive-OR logic gate 18 (which is based on the output of the non-linear feedback sub-system 34 and the random bit generator 14).

The random wait-state scheduler 12 is typically implemented in hardware using commercially available chips and/or logic gates or custom made chips and circuitry. However, it will be appreciated by those ordinarily skilled in the art that the random wait-state scheduler 12 can easily be implemented in software or partially in software and partially in hardware.

Figure 3:
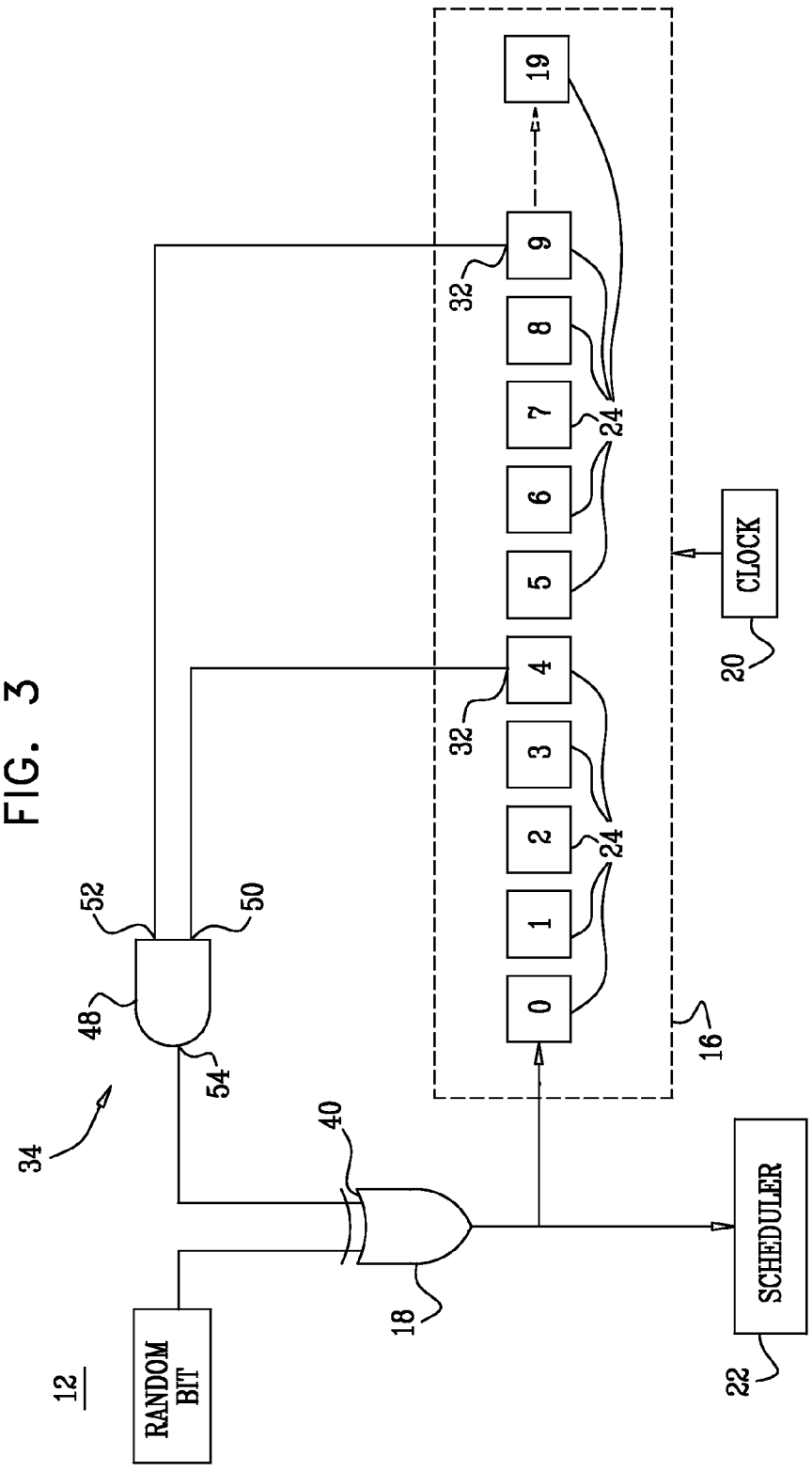
FIG. 3 is a first preferred embodiment of the random wait-state scheduler of FIG. 2.

Reference is now made to FIG. 3, which is a first preferred embodiment of the random wait-state scheduler 12 of FIG. 2.

In accordance with the first preferred embodiment of the random wait-state scheduler 12, the feedback function F of FIG. 2 typically has the form:

$$F(S_0, S_1 \ldots S_{L-1})=S_n \& S_{(2n+1)},$$

where 2n+1 is less than L, the number of stages 24 in the feedback shift-register 16. In other words, the output of the non-linear feedback function F is a result of performing an AND logic gate operation on the value of the output of the $n^{th}$ stage and the value of the output of the $(2n+1)^{th}$ stage.

Therefore, the non-linear feedback sub-system 34 is preferably operative to receive input from the $n^{th}$ stage and the $(2n+1)^{th}$ stage of the stages 24. In the example of FIG. 3, n is equal to 4 so the non-linear feedback sub-system 34 is operationally connected to the output 32 of stage 4 and the output 32 of stage 9.

The non-linear feedback sub-system 34 preferably includes an AND logic gate 48. The AND logic gate 48 typically has: an input 50 operationally connected to the output 32 of the $n^{th}$ stage; an input 52 operationally connected to the output 32 of the $(2n+1)^{th}$ stage; and an output 54. The output 54 of the AND logic gate 48 is generally operationally connected to the input 40 of the main exclusive-OR logic gate 18. Therefore, the output of the non-linear feedback sub-system 34 is preferably based on the value of the output of the AND logic gate 48.

Figure 4A:
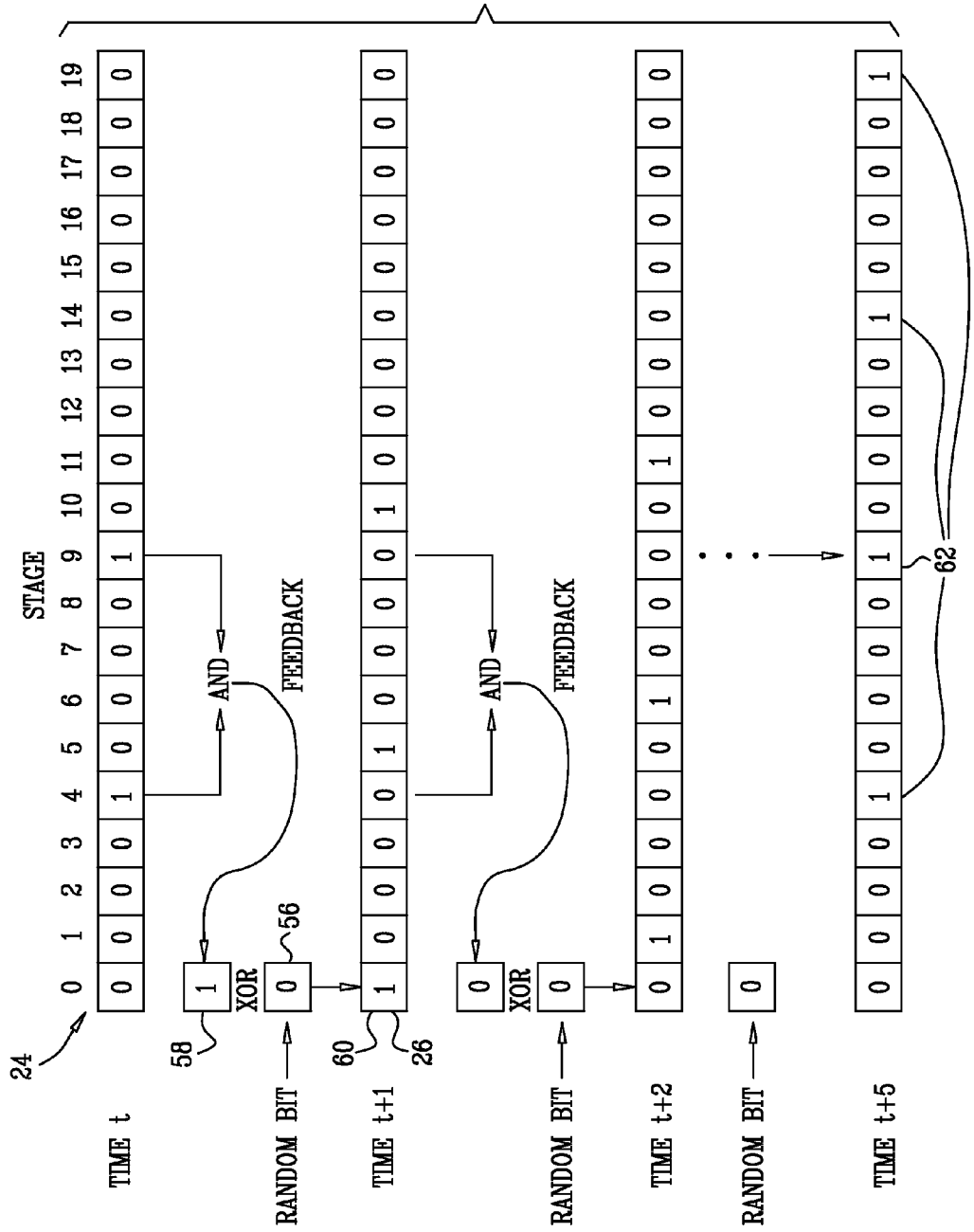
FIGS. 4a and 4b are partly pictorial, partly block diagram views illustrating operation of the random wait-state scheduler of FIG. 3.

Reference is now made to FIG. 4a, which is a partly pictorial, partly block diagram view illustrating operation of the random wait-state scheduler 12 of FIG. 3. FIG. 4a shows the state of the stages 24 of the feedback shift-register 16 of FIG. 3 and how the feedback function, F, is calculated over a plurality of times, from time t to time t+5.

The random bit generator 14 (FIG. 3) is typically biased so that a plurality of random/pseudo-random bits 56, outputted via the output 38 (FIG. 3) of the random bit generator 14, has a very high probability of yielding the value "0". The biasing of the random bit generator 14 is discussed in more detail with reference to FIG. 9. Therefore, at some point in time, the stages 24 are typically all empty. In other words, $S_i$ is equal to "0" for all i. All the stages 24 being empty is also known as the state of the feedback shift-register 16 being empty.

If the random/pseudo-random bits 56 produced by the random bit generator 14 include two bits equal to "1" separated by n stages, the feedback function F returns a result 58 equal to "1" after another n clock cycles. FIG. 4a shows that at time t, the state of stage 4 and stage 9 are both equal to "1". Therefore, performing an AND logic gate operation on the output of stage 4 and stage 9 gives "1" (the result 58). Assuming, the random/pseudo-random bit 56 is equal to "0", a result 60 of XORing "1" and "0" gives "1", which is now the new input into the first stage 26. In this way, a periodic sequence 62 of "1"s separated by n stages is set up, as shown at time t+5. The "1"s are typically used to schedule wait-states by the scheduler 22 of FIG. 3.

Figure 4B:
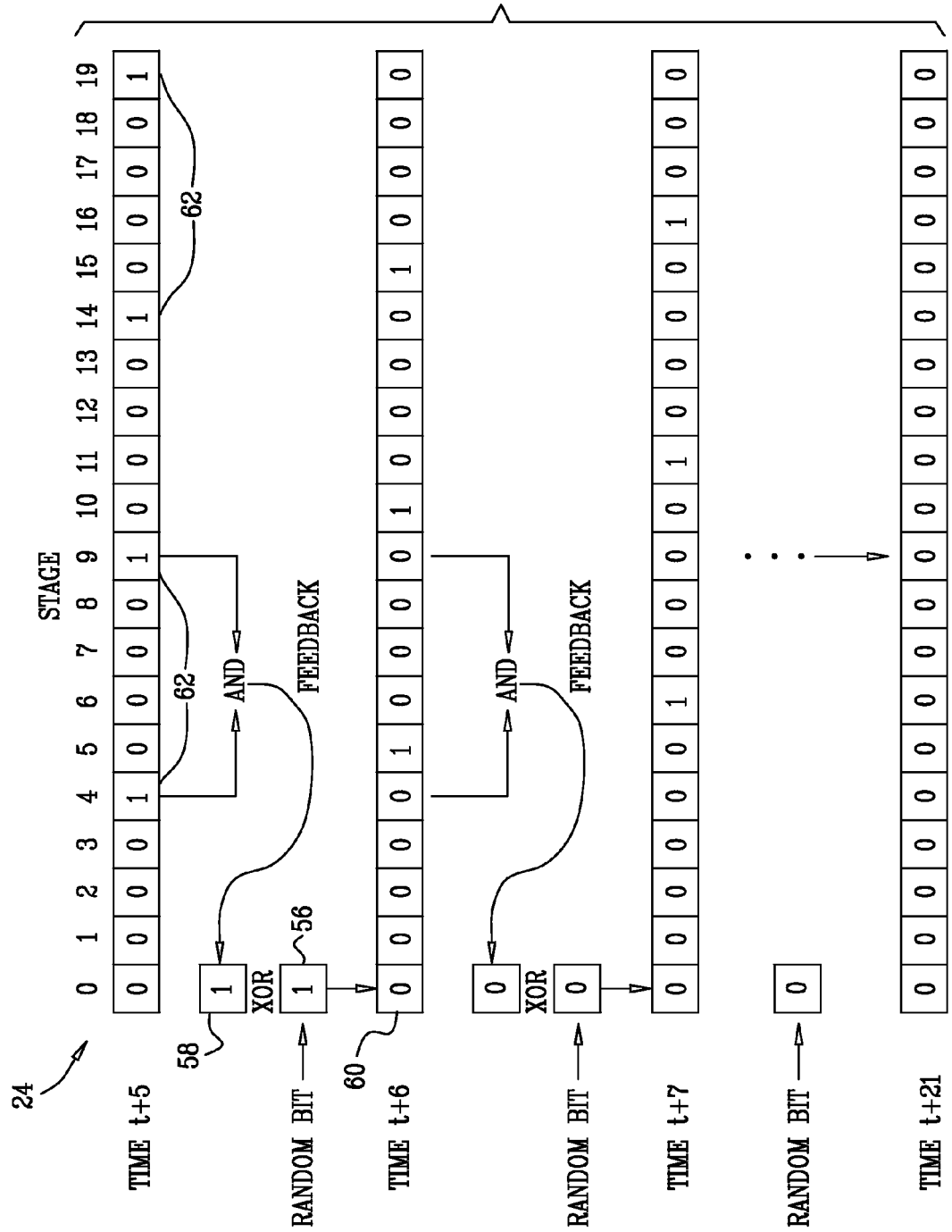

Reference is now made to FIG. 4b, which is a partly pictorial, partly block diagram view illustrating operation of the random wait-state scheduler 12 of FIG. 3. FIG. 4b shows the state of the stages 24 of the feedback shift-register 16 of FIG. 3 and how the feedback function, F, is calculated over a plurality of times, from time t+5 to time t+21.

At time t+5 the state of stage 4 and stage 9 are both equal to "1". In such a case, the result 58 of the feedback function is equal to "1".

If the randomi/pseudo-random bit 56 is equal to "1", which is a rare occurrence, then the result 60 of XORing the result 58 with the random/pseudo-random bit 56 is equal to "0". Therefore, the periodic sequence 62 is broken and the state of the feedback shift-register 16 (FIG. 2) will be empty at time t+21.

Therefore, the feedback shift-register 16 typically results in a plurality of random/pseudo-random bursts of the periodic sequences 62. Each periodic sequence 62 has "1"s spaced by n clock cycles apart. The scheduler 22 preferably translates the "1"s into wait-states. The periodic sequences 62 generally commence and terminate randomly/pseudo-randomly resulting in a high-variance for the wait-states.

The random wait-state scheduler 12 of FIGS. 3, 4a and 4b, generally provides the initialization and termination of a regular periodic sequence (the sequence 62) as a rare event. The random wait-state scheduler 12 may be enhanced by increasing the probability of "1"s in the random/pseudo-random bits 56 when the state is empty by suitably biasing the random bit generator 14, as described with reference to FIG. 9. Additionally, the random wait-state scheduler 12 may be enhanced by using a more complex feedback function F, as described with reference to the second and third preferred embodiments, described with reference to FIGS. 5-7.

Figure 5:
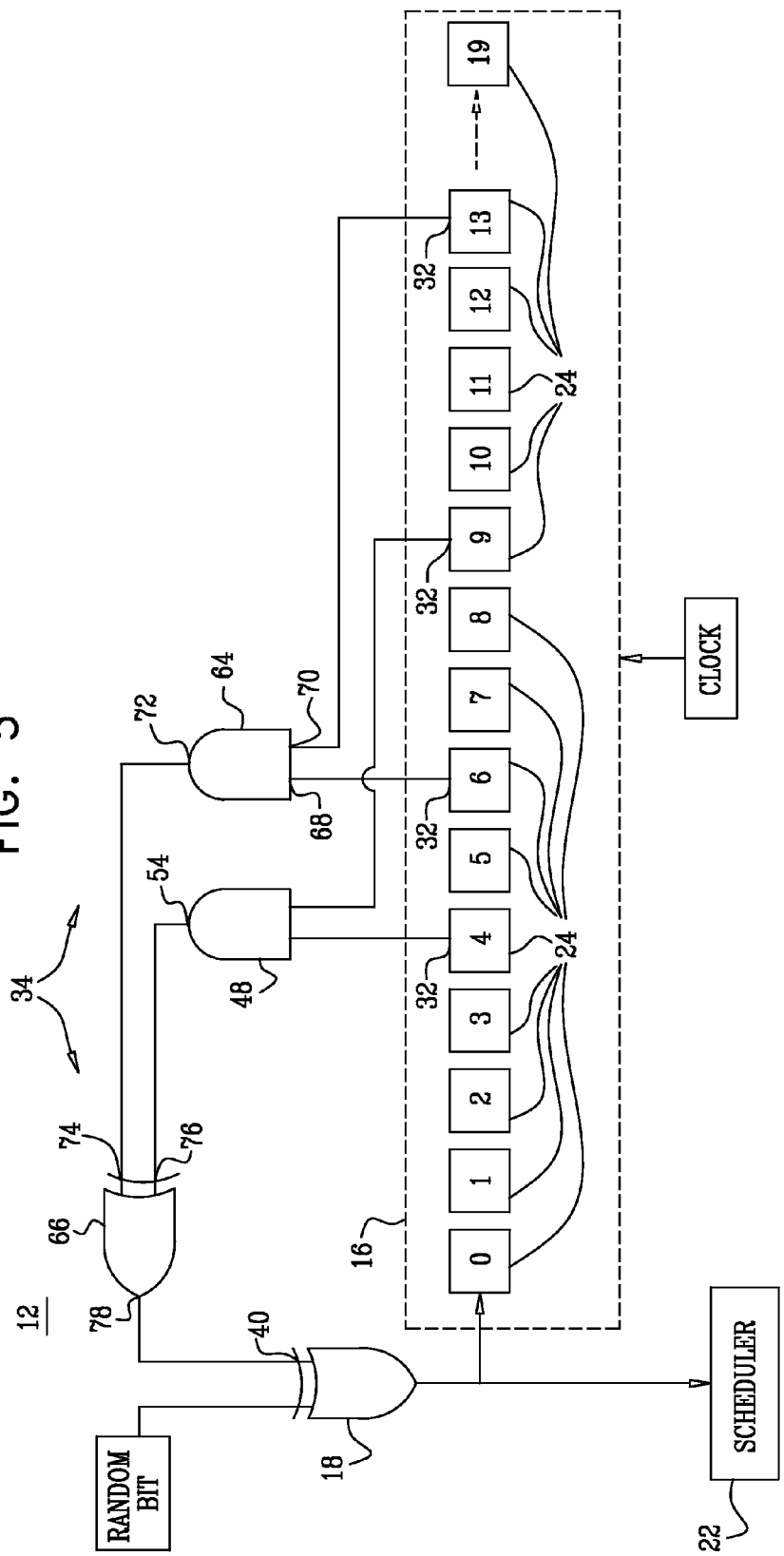
FIG. 5 is a second preferred embodiment of the random wait-state scheduler of FIG. 2.

Reference is now made to FIG. 5, which is a second preferred embodiment of the random wait-state scheduler 12 of FIG. 2.

The second preferred embodiment of the random wait-state scheduler 12 is substantially the same as the first preferred embodiment of the random wait-state scheduler 12 described with reference to FIG. 3 except for the following differences described below.

In accordance with the second preferred embodiment of the random wait-state scheduler 12, the feedback function F of FIG. 2 typically has the form:

$$F(S_0, S_1, \ldots S_{L-1})=[S_n \& S_{(2n+1)}] XOR [S_m \& S_{(2m+1)}],$$

where 2n+1 is less than L, 2m+1 is less than L, and m is not equal to n.

In other words, the output of the non-linear feedback function F is typically a result of performing: a first AND logic gate operation on the value of the output of the $n^{th}$ stage and the value of the output of the $(2n+1)^{th}$ stage; a second AND logic gate operation on the value of the output of the $m^{th}$ stage and the value of the output of the $(2m+1)^{th}$ stage; XORing the result of the first AND logic gate operation with the result of the second AND logic gate operation.

Therefore, the non-linear feedback sub-system 34 is preferably operative to receive input from the $n^{th}$ stage, the $(2n+1)^{th}$ stage, the $m^{th}$ stage, the $(2m+1)^{th}$ stage, of the stages 24. In the example of FIG. 5, n is equal to 4 and m is equal to 6, so the non-linear feedback sub-system 34 is operationally connected to the output 32 of stage 4, the output 32 of stage 6, the output 32 of stage 9 and the output 32 of stage 13.

In addition to the AND logic gate 48 described above with reference to FIG. 3, the non-linear feedback sub-system 34 preferably includes an AND logic gate 64 and an XOR logic gate 66.

The AND logic gate 64 preferably includes: an input 68 operationally connected to the output 32 of the $m^{th}$ stage; an input 70 operationally connected to the output of the $(2m+1)^{th}$ stage; and an output 72.

The XOR logic gate 66 generally includes: an input 74 operationally connected to the output 72 of the AND logic gate 64; an input 76 operationally connected to the output 54 of the AND logic gate 48; and an output 78 operationally connected to the input 40 of the main exclusive-OR logic gate 18.

Therefore, the output of the non-linear feedback sub-system 34 is preferably based on a value of the output of the XOR logic gate 66.

Figure 6A:
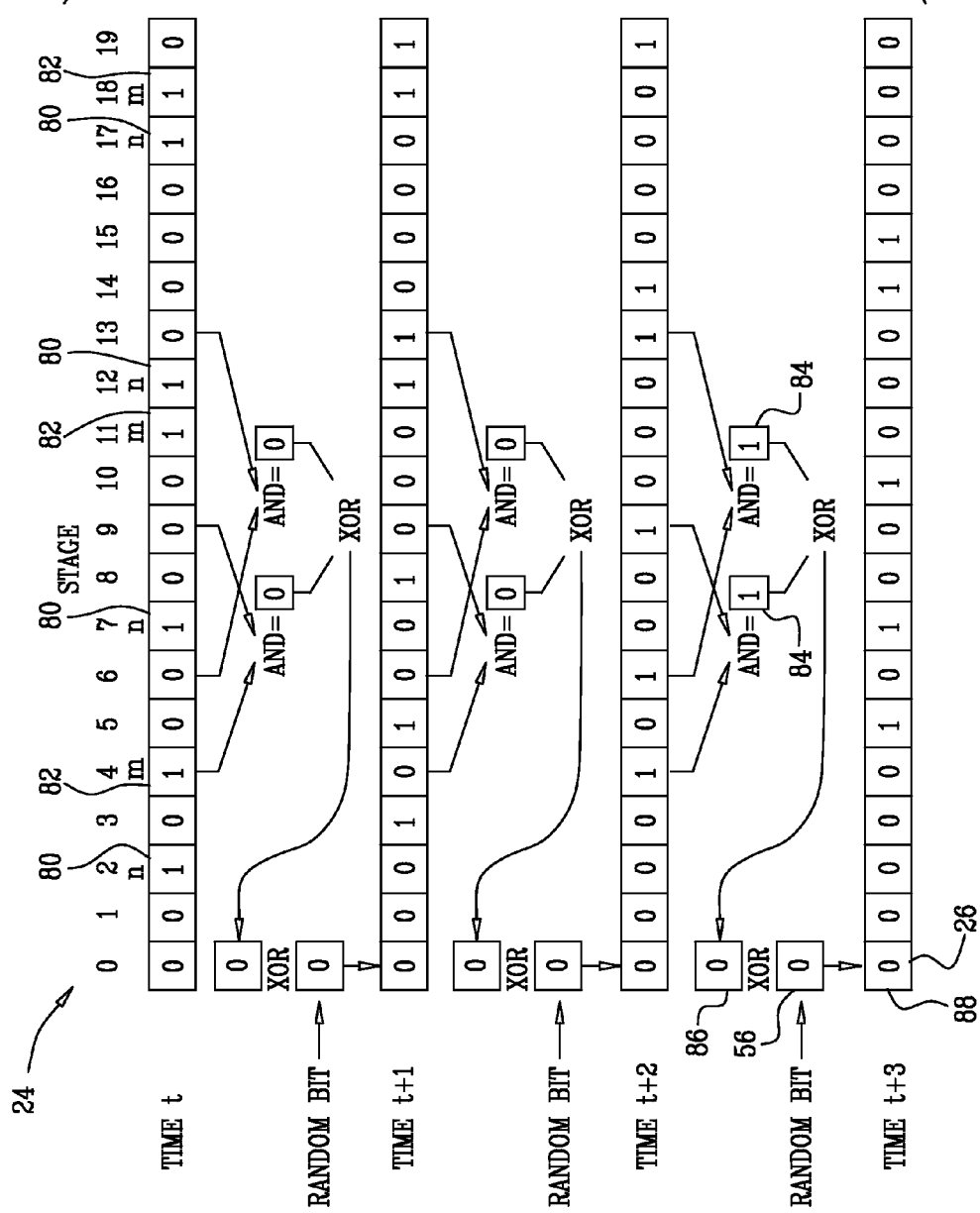

Reference is now made to FIGS. 6a and 6b, which are partly pictorial, partly block diagram views illustrating operation of the random wait-state scheduler 12 of FIG. 5. FIGS. 6a and 6b show the state of the stages 24 of the feedback shift-register 16 of FIG. 5 and how the feedback function, F, is calculated over a plurality of times, from time t to time t+20.

FIG. 6a shows at time t: a periodic sequence 80 of "1"s each separated by n stages; and a periodic sequence 82 of "1"s each separated by m stages.

Depending on the choice of m and n and the separation between the periodic sequence 80 and the periodic sequence 82, the periodic sequences 80, 82 may act like separate periodic sequences which terminate in a similar manner to the periodic sequence 62 of FIG. 4b and/or the periodic sequences 80,82 may collide as will be described below.

The feedback function from the state at time t+2 is typically calculated as follows. Both the AND logic gates operations based on the state at time t+2 yield a result 84 of "1". Performing an XOR logic gate operation on the results 84, yields a result 86 of "0". Performing an XOR logic gate operation on the result 84 with the random bit 56, yields a value 88 equal to "0".

At time t+3 for the periodic sequences to continue, it is necessary for the value of the first stage 26 to be "1" and not "0". The value "1" in the first stage 26 would be part of both the n periodic sequence 80 and the m periodic sequence 82.

However, due to a collision of the periodic sequences 80 and 82 when calculating the feedback function from the state at time t+2, calculated above, the value 88 of the first stage 26 is "0" at time t+3, thereby breaking both the periodic sequence 80 and the periodic sequence 82. The broken periodic sequences 80, 82 slowly work themselves out of the stages 24 until the state of the feedback shift-register 16 (FIG. 3) is empty at time t+20 (FIG. 6b).

Adding the monomial $S_m \& S_{(2m+1)}$ to the feedback function, F, makes the pattern of the output of the main exclusive-OR logic gate 18 (FIG. 5) more complex. By adding a third suitably chosen monomial preferably adds the possibility of a third periodic sequence being created from two other sequences, as will be described with reference to FIGS. 7 and 8 below. The possibility of creating a third sequence based on the remains of two other sequences further adds "chaos" to the output the random wait-state scheduler 12.

Reference is now made to FIG. 7, which is a third preferred embodiment of the random wait-state scheduler 12 of FIG. 2.

The third preferred embodiment of the random wait-state scheduler 12 is substantially the same as the second preferred embodiment of the random wait-state scheduler 12 described with reference to FIG. 3 except for the following differences described below.

In accordance with the third preferred embodiment of the random wait-state scheduler 12, the feedback function F, of FIG. 2, is a sum (which is an XOR) of several monomials, so that F typically has the form:

$$F(S_0, S_1, \ldots S_{L-1})=[S_k \& S_{(2k+1)}] XOR [S_m \& S_{(2m+1)}] \\ XOR [S_n \& S_{(2n+1)}],$$

where 2k+1 is less than L, 2m+1 is less than L, 2n+1 is less than L, and k, m and n are different.

In other words, the output of the non-linear feedback function F is typically a result of performing: a first AND logic gate operation on the value of the output of the $k^{th}$ stage and the value of the output of the $(2k+1)^{th}$ stage; a second AND logic gate operation on the value of the output of the $m^{th}$ stage and the value of the output of the $(2m+1)^{th}$ stage; a third AND logic gate operation on the value of the output of the $n^{th}$ stage and the value of the output of the $(2n+1)^{th}$ stage; and XORing the results of the AND logic gate operations together.

Therefore, the non-linear feedback sub-system 34 is typically operative to receive input from the $k^{th}$ stage, the $(2k+1)^{th}$ stage, the $m^{th}$ stage, the $(2m+1)^{th}$ stage, the $n^{th}$ stage, the $(2n+1)^{th}$ stage, of the stages 24. In the example of FIG. 7, k is equal to 8, n is equal to 4 and m is equal to 6, so the non-linear feedback sub-system 34 is operationally connected to the output 32 of stages 4, 6, 7, 8, 9, 13, and 17.

With suitably chosen k, in, n and a suitably chosen probability of "1"s appearing in the input bit stream, unpredictable bursts of random delays will be produced. To make the bursts closer to each other, the probability of "1"s appearing in the input bit stream is increased, for example, but not limited to, in a situation when the state of the feedback shift-register 16 is empty. When the probability of "1"s is increased, for example, by suitably biasing the random bit generator 14, the output 38 of the random bit generator 14 may be directly connected to the input 30 of the first stage 26, bypassing the main exclusive-OR logic gate 18, so that the scheduler 22 does not schedule wait-states based on the output of the random bit generator 14.

In the above feedback function, a k periodic sequence of "1"s and/or an m periodic sequence of "1"s and/or an n periodic sequence of "1"s may be set-up in the feedback shift-register 16. The periodic sequences may exist separately or at the same time. Depending on the choice of k, m and n and the spacing between the periodic sequences, an individual periodic sequence may terminate due to a "1" produced by the random bit generator 14 at a certain time or two or more of the periodic sequences may terminate due to a collision, as explained above with reference to FIGS. 6a and 6b or two sequences may create a third sequence as described in more detail with reference to FIG. 8.

In addition to the AND logic gate 48, the AND logic gate 64, and the XOR logic gate 66 described above with reference to FIG. 5, the non-linear feedback sub-system 34 preferably includes an AND logic gate 90 and an XOR logic gate 92.

The AND logic gate 90 typically has: an input 94 operationally connected to the output of the $k^{th}$ stage; an input 96 operationally connected to the output of the $(2k+1)^{th}$ stage; and an output 98.

The XOR logic gate 92 generally has: an input 100 operationally connected to the output 78 of the XOR logic gate 66; an input 102 operationally connected to the output 98 of the AND logic gate 90; and an output 104 operationally connected to the input 40 of the main exclusive-OR logic gate 18.

Therefore, the output of the non-linear feedback sub-system 34 is preferably based on a value of the output of the XOR logic gate 92 of the non-linear feedback sub-system 34.

It will be appreciated by those ordinarily skilled in the art that 1, 2 or 3 monomials in the feedback function F is by way of example only, and that any suitable number of monomials may be used. One monomial generally results in the creation and termination of a single periodic sequence. A second suitably chosen monomial additionally results in the periodic sequences colliding and thereby terminating. A third suitably chosen monomial additionally results in two periodic sequences creating a third sequence.

It will be appreciated by those ordinarily skilled in the art that any suitable number of stages may be used in the feedback shift-register 16.

Figure 8:
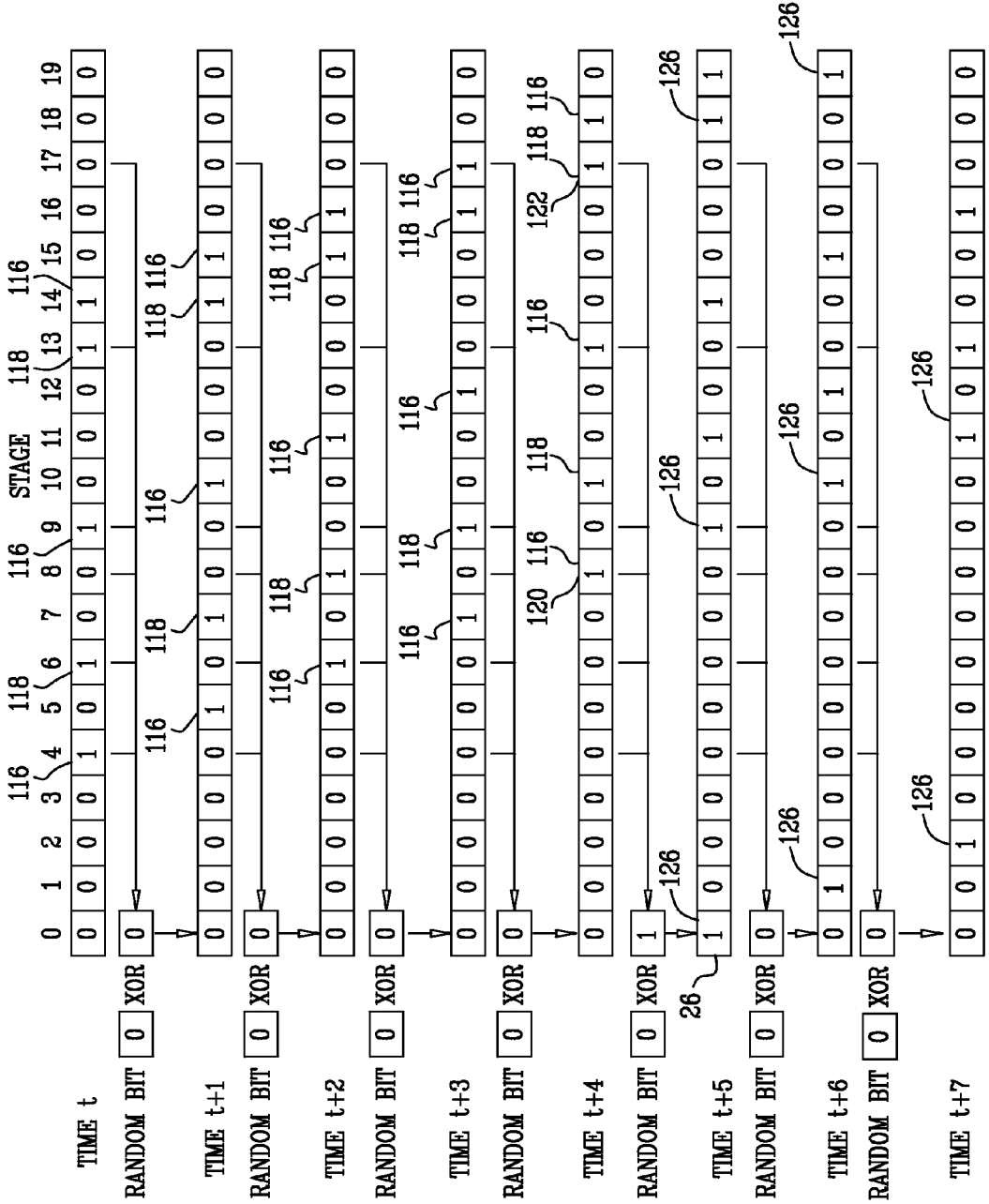
FIG. 8 is a partly pictorial, partly block diagram view illustrating operation of the random wait-state scheduler of FIG. 7.

Reference is now made to FIG. 8, which is a partly pictorial, partly block diagram view illustrating operation of the random wait-state scheduler 12 of FIG. 7.

A time t, the state of the random wait-state scheduler 12 (FIG. 7) includes: a periodic sequence 116 having a spacing of n (4 in the example of FIG. 8); and a periodic sequence 118 having a spacing of m (6 in the example if FIG. 8).

At time t, the periodic sequence 116 and the periodic sequence 118 collide. The collision of the periodic sequences 116, 118 interrupts the sequences and over time it appears that the sequences will terminate.

However, at time t+4, a value 120 from the periodic sequence 116 and a value 122 from the periodic sequence 118 coincide with the input for the feedback function for the $k^{th}$ and $(2k+1)^{th}$ stage (stage 8 and 17 in the example of FIG. 8), respectively. Therefore, an output 124 of the feedback function, F, is equal to "1" and the input to the first stage 26 is equal to "1". Therefore, a new periodic sequence 126 having a spacing of k is established.

In the above way, the terminating periodic sequences 116, 118 develop into the new periodic sequence 126.

Reference is now made to FIG. 9, which is a partly pictorial, partly block diagram view of the random bit generator 14 for use with the secure device 10 of FIG. 1.

The random bit generator 14 preferably includes an unbiased random number generator 114 for generating a plurality of random/pseudo-random bits 106 (zeros or ones) with an equal probability of zeros and ones, as is known to those ordinarily skilled in the art.

The random bit generator 14 also typically includes an output weighting module 108 operationally connected to the unbiased random number generator 114. The output weighting module 108 is generally operative to receive the random/pseudo-random bits 106 and group the random/pseudo-random bits 106 into groups of P bits. If all the bits in a group are "1"s, the output weighting module 108 preferably produces a result 110 equal to "1". If the group includes even one "0", then the output weighting module 108 preferably produces a result 112 equal to "0".

The results 110, 112 are then generally outputted via the output 38 of the random bit generator 14.

The probability of the random bit generator 14 outputting a "1" is equal to $2^{-P}$.

Therefore, the output of the random bit generator 14 may be biased by increasing or decreasing P as appropriate.

The value of P may take any suitable value, for example, but not limited to, between 5 and 15.

Typically, the output of the random bit generator 14 is biased according to the state of the stages 24 (FIG. 2) of the feedback shift-register 16 so that when the state is empty, or almost empty, the value of P is decreased, and when the state is populated the value of P is increased to the previous value of P. The state is typically defined as "almost empty" when all the values of the stages 24 are equal to zero up to and including the greater of: the $k^{th}$, $m^{th}$ or $n^{th}$ stage. It will be appreciated by those ordinarily skilled in the art that the definition of "almost empty" may be adjusted if the function F includes more than 3 monomials.

The following is a non-limiting example of the random wait-state scheduler 12 of FIG. 2. The feedback shift-register 16 includes 30 stages. The non-linear feedback sub-system 34 is configured such that k=14, m=9, n=11. P of the random bit generator 14 is set to 7 when the state is empty and set to 13 when the state is populated.

It will be appreciated by those ordinarily skilled in the art that the number of stages and the values of k, m, n and P may be any suitable values. Additionally more monomials may be added to the feedback function F.

The random wait-state scheduler 12 is typically implemented in hardware using commercially available chips and/or logic gates or custom made chips and circuitry. However, it will be appreciated by those ordinarily skilled in the art that the random wait-state scheduler 12 can easily be implemented in software or partially in software and partially in hardware.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination. It will also be appreciated by persons skilled in the art that the present invention is not limited by what has been particularly shown and described hereinabove. Rather the scope of the invention is defined only by the claims which follow.

What is claimed is:

1. A system, comprising:
a feedback shift-register having:
L serially connected stages including a first stage and a final stage, the stages being denoted 0 to L−1 from the first stage to the final stage respectively, the stages being operative to store a plurality of bits such that each of the stages is operative to store one of the bits; and a non-linear feedback sub-system, at least some of the stages having an output operationally connected to the non-linear feedback sub-system, the non-linear feedback sub-system being operative to receive input from a stage n, m, k, 2n+1, 2m+1 and 2k+1 of the stages, the non-linear feedback sub-system including a first AND logic gate, the first AND logic gate having: a first input operationally connected to the output of the stage n; a second input operationally connected to the output of the stage 2n+1; and an output, the non-linear feedback sub-system including a second AND logic gate and a first XOR logic gate, the second AND logic gate having: a first input operationally connected to the output of the stage m; a second input operationally connected to the output of the stage 2m+1; and an output, the first XOR logic gate of the feedback sub-sub-system having: a first input operationally connected to the output of the first AND logic gate; and a second input operationally connected to the output of the second AND logic gate, the non-linear feedback sub-system including a third AND logic gate and a second XOR logic gate, the third AND logic gate having: a first input operationally connected to the output of the stage k; a second input operationally connected to the output of the stage 2k+1; and an output, the second XOR logic gate of the feedback sub-sub-system having: a first input operationally connected to the output of the first XOR logic gate; and a second input operationally connected to the output of the third AND logic gate, an output of the non-linear feedback sub-system is based, at least in part, on a value of the output of the second XOR logic gate of the non-linear feedback sub-system;

a clock operationally connected to the feedback shift-register, the clock being operative to control the movement of the bits along the stages;

a bit generator having an output, the bit generator being operative to generate a plurality of random/pseudo-random bits for outputting via the output of the bit generator, the bit generator being operative such that the output of the bit generator is biased according to a state of the stages of the feedback shift-register;

a main XOR logic gate having a first and second input and an output, the output of the bit generator being operationally connected to the first input of the main XOR logic gate, the output of the non-linear feedback sub-system being operationally connected to the second input of the main XOR logic gate, the output of the main XOR logic gate being operationally connected to the input of the first stage of the feedback shift-register; and a scheduler having an input operationally connected to the main XOR logic gate or the feedback shift-register, the scheduler being operative to schedule a plurality of wait-states according to data received by the input of the scheduler.

2. A system, comprising:
a feedback shift-register having:
L serially connected stages including a first stage and a final stage, the stages being denoted 0 to L−1 from the first stage to the final stage respectively, the stages being operative to store a plurality of bits such that each of the stages is operative to store one of the bits; and a non-linear feedback sub-system, at least some of the stages having an output operationally connected to the non-linear feedback sub-system, the non-linear feedback sub-system being operative to receive input from a stage n and a stage 2n+1 of the stages, the non-linear feedback sub-system including a first AND logic gate, the first AND logic gate having: a first input operationally connected to the output of the stage n; a second input operationally connected to the output of the stage 2n+1; and an output, the non-linear feedback sub-system having an output based, at least in part, on a value of the output of the first AND logic gate;

a clock operationally connected to the feedback shift-register, the clock being operative to control the movement of the bits along the stages;

a bit generator having an output, the bit generator being operative to generate a plurality of random/pseudo-random bits for outputting via the output of the bit generator; and a main XOR logic gate having a first and second input and an output, the output of the bit generator being operationally connected to the first input of the main XOR logic gate, the output of the non-linear feedback sub-system being operationally connected to the second input of the main XOR logic gate, the output of the main XOR logic gate being operationally connected to the input of the first stage of the feedback shift-register.

3. The system according to claim 2, wherein:
the non-linear feedback sub-system is operative to receive input from a stage m and a stage 2m+1 of the stages;
the non-linear feedback sub-system includes a second AND logic gate and a first XOR logic gate, the second AND logic gate having: a first input operationally connected to the output of the stage m; a second input operationally connected to the output of the stage 2m+1; and an output,
the first XOR logic gate of the feedback sub-sub-system has:
a first input operationally connected to the output of the first AND logic gate; and
a second input operationally connected to the output of the second AND logic gate; and
the output of the non-linear feedback sub-system is based, at least in part, on a value of the output of the first XOR logic gate of the non-linear feedback sub-system.

4. The system according to claim 3, wherein:
the non-linear feedback sub-system is operative to receive input from a stage k and a stage 2k+1 of the stages;
the non-linear feedback sub-system includes a third AND logic gate and a second XOR logic gate, the third AND logic gate having: a first input operationally connected to the output of the stage k; a second input operationally connected to the output of the stage 2k+1; and an output,
the second XOR logic gate of the feedback sub-sub-system has:
a first input operationally connected to the output of the first XOR logic gate; and
a second input operationally connected to the output of the third AND logic gate; and
the output of the non-linear feedback sub-system is based, at least in part, on a value of the output of the second XOR logic gate of the non-linear feedback sub-system.

5. The system according to claim 2, wherein the bit generator is operative such that the output of the bit generator is biased according to a state of the stages of the feedback shift-register.

6. The system according to claim 2, further comprising a scheduler having an input operationally connected to the main XOR logic gate or the feedback shift-register, the scheduler being operative to schedule a plurality of wait-states according to data received by the input of the scheduler.

7. A method, comprising:
provising a feedback shift-register having L serially connected stages including a first stage and a final stage, the stages being denoted 0 to L−1 from the first stage to the final stage respectively, the stages being operative to store a plurality of bits such that each of the stages is operative to store one of the bits; and
performing the following a plurality of times:
performing an AND logic gate operation with the output of a stage n and a stage 2n+1 of the stages as input yielding a first result;
performing an AND logic gate operation with the output of a stage k and a stage 2k+1 of the stages as input yielding a second result;
performing an AND logic gate operation the output of a stage m and a stage 2m+1 of the stages as input yielding a third result, n, m and k being different;
performing an XOR logic gate operation using the first result the second result and the third result as input yielding a fourth result;
generating a random/pseudo-random bit;
performing an XOR logic gate operation with the random/pseudo-random bit and the fourth result as input yielding a fifth result;
shifting the bits along the stages; and
inserting the fifth result into the first stage.

* * * * *